United States Patent
Lai et al.

(10) Patent No.: US 8,902,261 B2
(45) Date of Patent: Dec. 2, 2014

(54) LIGHT SOURCE CONTROL METHOD OF PROJECTOR

(75) Inventors: Chia-Cheng Lai, Tainan County (TW);
Yao-Hung Lai, Tainan County (TW);
Chia-Chuan Lee, Tainan County (TW)

(73) Assignees: Himax Display, Inc., Tainan (TW);
Himax Technologies Limited, Tainan (TW)

( * ) Notice: Subject to any disclaimer, the term of this patent is extended or adjusted under 35 U.S.C. 154(b) by 716 days.

(21) Appl. No.: 12/728,437

(22) Filed: Mar. 22, 2010

(65) Prior Publication Data
US 2011/0228174 A1 Sep. 22, 2011

(51) Int. Cl.
*G09G 5/10* (2006.01)
*H04N 9/31* (2006.01)
(52) U.S. Cl.
CPC ........... *H04N 9/3197* (2013.01); *H04N 9/3155* (2013.01)
USPC ................ 345/690; 345/88; 345/89; 345/102
(58) Field of Classification Search
USPC ...................................... 345/88, 89, 102, 690
See application file for complete search history.

(56) References Cited

U.S. PATENT DOCUMENTS

| | | | |
|---|---|---|---|
| 8,184,087 B2* | 5/2012 | Lin et al. | 345/102 |
| 2006/0239033 A1 | 10/2006 | Jung et al. | |
| 2009/0167788 A1* | 7/2009 | Lin et al. | 345/690 |

FOREIGN PATENT DOCUMENTS

| | | |
|---|---|---|
| CN | 101329846 A | 12/2008 |
| TW | 200807391 | 2/2008 |
| TW | 200921609 | 5/2009 |

OTHER PUBLICATIONS

"Office Action of Taiwan Counterpart Application", issued on Sep. 18, 2013, p. 1-p. 7, in which the listed references were cited.
"Office Action of Taiwan Counterpart Application", issued on Nov. 27, 2013, p. 1-p. 5, in which US20060239033 and TW200921609 were cited.

* cited by examiner

*Primary Examiner* — Jonathan Boyd
(74) *Attorney, Agent, or Firm* — J.C. Patents

(57) ABSTRACT

A light source control method of a projector is provided. The light source control method includes the following steps. A frame data of a frame period is received. Gray distributions of a plurality of colors in the frame data are obtained by analyzing the frame data. Whether to shut all or a portion of a plurality of color light sources of the projector is determined according to the gray distributions of the colors. Therefore, the power consumption of the projector can be reduced.

20 Claims, 3 Drawing Sheets

LIGHT SOURCE CONTROL METHOD OF PROJECTOR

BACKGROUND OF THE INVENTION

1. Field of the Invention

The present invention relates to a light source control method. More particularly, the present invention relates to a light source control method of a projector.

2. Description of Related Art

A projection apparatus can project images onto a large screen to facilitate more people watching the images displayed on the screen at the same time. Therefore, the projection apparatus is generally used in public places such as companies, schools, etc. Moreover, as family-used display products trend to be large-scaled, the projection apparatus is also widely used in general families, and becomes a commonly used electronic product in people's daily life.

With development of technology, electronic products are developed to have high speed, high performance, and design features of lightness, slimness, shortness and smallness. In this case, pico projectors (or mini projectors) have become a main stream in the market of personal digital products. Generally, a light source of the pico projector applies a light emitting diode (LED) or other solid state light sources to improve a total lumen thereof, so as to improve a brightness of projected images. After the pico projector is produced, a size of the pico projector including a battery is similar to a size of a general mobile phone in the market. Even, the pico projector can be integrated in the mobile phone. Therefore, it has advantages of portability and no restriction of usage locations.

However, since the projector requires a continuous light source to perform the projection, the LED serving as the light source has to continuously emit light. Moreover, when the LED continuously emits light, power of the battery is continuously consumed. Generally, when the pico projector operates, power consumption of the light source occupies 70%-90% of power consumption of the whole pico projector. Namely, the light source of the pico projector is the most power-consuming part of the whole pico projector, and an amount of power consumed by the light source determines a usage time of the pico projector using the battery as a power supply.

SUMMARY OF THE INVENTION

The present invention is directed to a light source control method of a projector, by which when gray distributions are lower than a gray level, all or a portion of color light sources provided by a light source module are shut to save a power consumption.

The present invention provides a light source control method of a projector. The light source control method includes the following steps. A frame data of a frame period is received, and gray distributions of a plurality of colors in the frame data are obtained by analyzing the frame data. Whether to shut all or a portion of a plurality of color light sources of the projector during the frame period is determined according to the gray distributions of the colors.

The present invention provides another light source control method of a projector. The light source control method includes the following steps. A frame data of a frame period is received, and gray distributions of a plurality of colors in the frame data are obtained by analyzing the frame data. Whether to shut a light source of the projector during the frame period is determined according to the gray distributions of the colors.

According to the above descriptions, in the light source control method of the present invention, whether to shut the light sources provided by the light source module is determined according to the gray distributions of the color light sources. Moreover, a data gain of the frame data and duty cycles of the color light sources are adjusted according to an average luminance of the frame data. In this way, on the premise of maintaining a display effect, a light leakage phenomenon is avoided, so that a purity of the frame is improved, and the power consumption is reduced.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
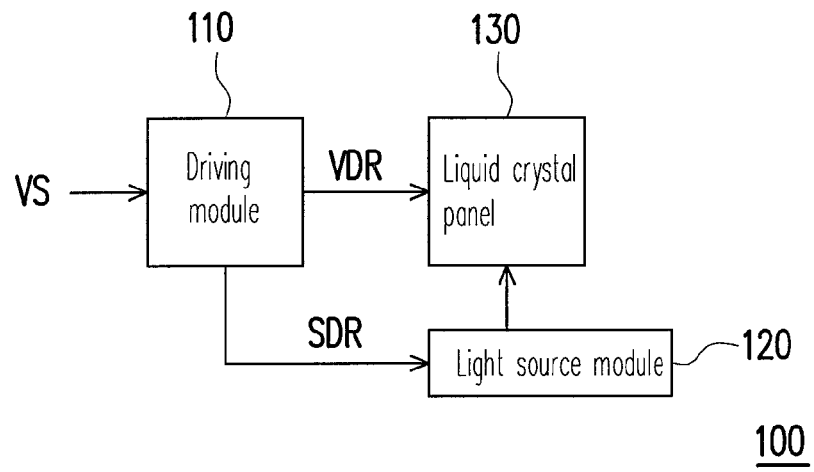
FIG. 1 is a system schematic diagram of a projector according to an embodiment of the present invention.

FIG. 1 is a system schematic diagram of a projector according to an embodiment of the present invention. Referring to FIG. 1, the projector 100 includes a driving module 110, a light source module 120 and a liquid crystal panel 130, wherein the liquid crystal panel 130 can be a liquid crystal on silicon (LCOS) panel, and the projector 100 can be a pico projector. The driving module 110 receives a video signal VS, and generates a driving voltage VDR to the liquid crystal panel 130 and generates a driving signal SDR to the light source module 120 according to frame data transmitted by the video signal VS. The liquid crystal panel 130 arranges the liquid crystal according to the driving voltage VDR, and the light source module 120 provides light sources to the liquid crystal panel 130 according to the driving signal SDR. The liquid crystal panel 130 projects light to a target (for example, a screen or a wall) by reflecting/transmitting the light sources provided by the light source module 120, so as to display images.

In terms of a present technique, the LCOS panels are approximately grouped into color filter (CF)-LCOS panels and color sequential (CS)-LCOS panels. Regarding the CF-LCOS panel, color filters are formed on the liquid crystal panel 130 for displaying different colors, i.e. a spatial color mixing effect is provided to display color images, and the light source module 120 can correspondingly provide white light to serve as the light source. Moreover, regarding the CS-LCOS panel, the color filters are not formed on the liquid crystal panel 130, and a color sequential method is used to achieve a temporal color mixing effect to display the color images, and now the light source module 120 can correspondingly provides different color light sources (for example, red light, blue light and green light) at different time points. Wherein, the white light, the red light, the blue light and the green light can be provided by light-emitting diodes (LEDs) of corresponding colors.

Figure 2:
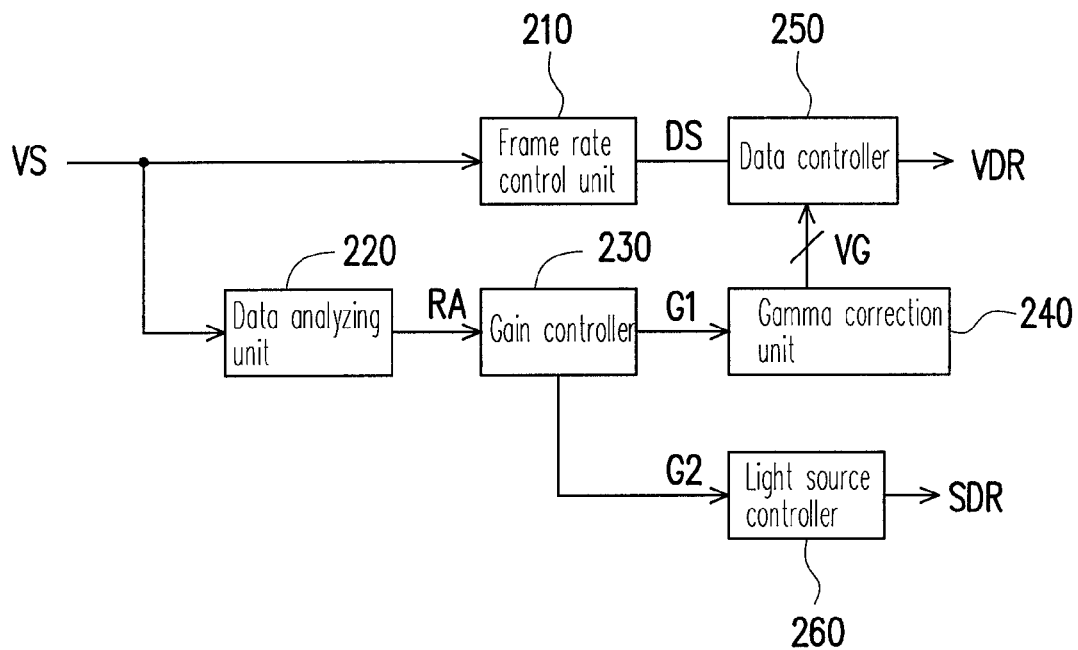
FIG. 2 is a system schematic diagram of a driving module of FIG. 1.

FIG. 2 is a system schematic diagram of the driving module of FIG. 1. Referring to FIG. 1 and FIG. 2, the driving module 110 includes a frame rate control unit 210, a data analysing unit 220, a gain controller 230, a gamma correction unit 240, a data controller 250, and a light source controller 260. The frame rate control unit 210 receives the frame data transmitted by the video signal VS, and generates a display data DS to the data controller 250 according to a frame rate control method. The data analysing unit 220 receives the frame data transmitted by the video signal VS, and analyses the frame data, and transmits an analysis result RA to the gain controller 230.

The gain controller 230 outputs a data gain G1 to the gamma correction unit 240 according to the analysis result RA, and outputs a light source gain G2 to the light source controller 260 according to the analysis result RA. The gamma correction unit 240 provides a plurality of gamma voltages VG to the data controller 250 according to the data gain G1, wherein the gamma voltages VG respectively correspond to a gray level. The data controller 250 selects to output a gamma voltage VG to serve as the driving voltage VDR according to the display data DS. The light source controller 260 generates the driving signal SDR according to the light source gain G2, and provides a corresponding number of the driving signals SDR according to the number of color light sources provided by the light source module 120. In other words, if the liquid crystal panel 130 is the CF-LCOS panel, the light source module 120 provides the white light, so that the light source controller 260 correspondingly generates one driving signal SDR to drive a white LED to emit light. Moreover, if the liquid crystal panel 130 is the CS-LCOS panel, the light source module 120 can provide the red light, the blue light and the green light at different time points, so that the light source controller 260 correspondingly generates three driving signals SDR to respectively control a red LED, a blue LED and a green LED to emit light at different time points.

Further, when the data analysing unit 220 receives a frame data of a frame period, the data analysing unit 220 analyses the frame data to obtain gray distributions of three primary colors (i.e. red, blue and green) to serve as the analysis result RA. Then, the gain controller 230 determines whether to shut the light sources provided by the light source module 120 according to the gray distributions of the three primary colors. Taking the CS-LCOS panel as an example, when a gray level average of the gray distribution of one of the three primary colors (for example, the red color) is less than or equal to a threshold value, it represents that the frame almost has none such color component, so that the color light source (for example, the red light) of such color can be shut when the frame is displayed. Conversely, when the gray level average of the gray distribution of such color is greater than the threshold value, the color light source of such color is correspondingly activated. Wherein, the threshold value is generally a lower gray level (for example, a gray level of 15), though the threshold value can be different according to an actual circuit design and different usage habit, which is not limited by the present invention. Therefore, a power consumption of the light source can be saved.

Moreover, besides determining whether to shut the corresponding color light source according to the gray level average of each of the colors, the gain controller 230 can also determine whether to shut the corresponding color light source according to whether the gray distribution of each of the colors is smaller than or equal to a threshold range. In other words, when the gray distribution of a certain color is smaller than or equal to the threshold range, the color light source of the corresponding color is shut. Conversely, when the gray distribution of such color is beyond the threshold range (i.e. the gray distribution of such color is not only smaller than or equal to the threshold range, but also exceeds the threshold range), the color light source of the corresponding color is activated. Wherein, the color light source can be shut or activated by setting the light source gain G2.

Figure 3:
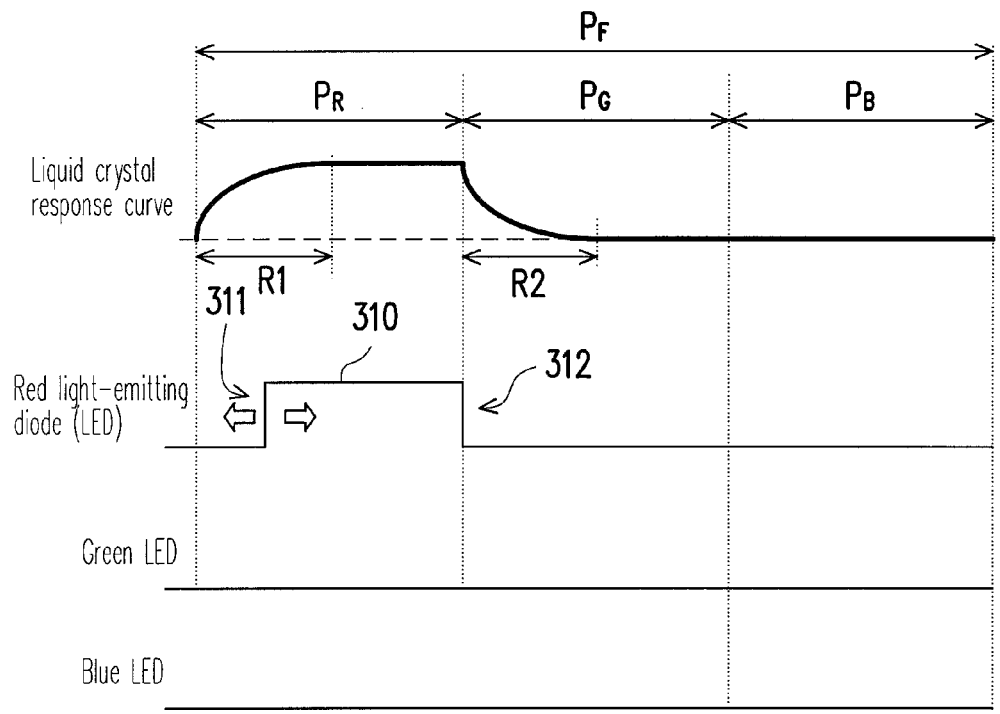
FIG. 3 is a schematic diagram illustrating a driving waveform of a red frame according to an embodiment of the present invention.

FIG. 3 is a schematic diagram illustrating a driving waveform of a red frame according to an embodiment of the present invention. Referring to FIG. 2 and FIG. 3, the data analysing unit 220 receives a lot of frame data of a red frame during a frame period $P_F$, and transmits the gray distributions of the three primary colors to the gain controller 230. Moreover, in the red frame, since there are little blue and green colors, or even there is none blue and green colors, the gray level averages of the blue color and the green color are less than the threshold value, or the gray distributions of the blue color and the green color are smaller than or equal to the threshold range. Therefore, the gain controller 230 shuts the blue light and the green light provided during a blue sub frame period $P_B$ and a green sub frame period $P_G$, and only maintains the red light provided during a red sub frame period $P_R$. Accordingly, if the data analysing unit 220 receives a pure frame (for example, a pure red frame, a pure green frame, a pure blue frame, a pure yellow frame, a pure purple frame, a pure cyan frame or a pure black frame) or a frame close to a pure color, the gain controller 230 shuts a part of or all of the red light, the green light and the blue light.

As shown in FIG. 3, since arrangement of the liquid crystal requires a response time (for example, R1 and R2), assuming that when the green light is provided during the green sub frame period $P_G$, the liquid crystal is still not recovered to a normal state (i.e. the liquid crystal still has a transmittance), a little green light can still be transmitted through the liquid crystal, which may cause a light leakage phenomenon, so that a purity of the red frame is reduced. According to the above description, when the blue light and the green light are shut, the frame can still be normally displayed, so that the light leakage phenomenon is avoided, and the purity of the frame is improved. Moreover, the power required for lighting the green LED and the blue LED is saved.

Referring to FIG. 2 again, taking the CF-LCOS panel as an example, when the gray level average of the gray distributions of the three primary colors are less than or equal to the threshold value (i.e. the frame is pure black or close to pure black), the white light is shut. Conversely, when the gray level average of the gray distributions of the three primary colors are greater than the threshold value, the white light is activated. Alternatively, when the gray distributions of the three primary colors are smaller than or equal to the threshold range, the white light is shut. Conversely, when the gray distribution of one of the three primary colors is beyond the threshold range, the white light is activated.

Moreover, the driving module 110 of the present embodiment can shut the color light sources provided by the light source module 120, and can also adjust duty cycles of the color light sources according to the frame data. Referring to FIG. 2 again, when the data analysing unit 220 receives the frame data during the frame period, the data analysing unit 220 analyse the frame data to obtain an average luminance of the frame data to serve as the analysis result RA. Moreover, the gain controller 230 adjusts a magnitude of a driving voltage corresponding to the display data and duty cycles of the color light sources in the frame period according to the average luminance. In case of the CS-LCOS panel, the gain controller 230 can adjust the duty cycles of the three primary color light. In case of the CF-LCOS panel, the gain controller 230 can adjust the duty cycle of the white light.

Further, when the average luminance of the frame data is greater than a luminance reference value, the magnitude of the driving voltage corresponding to the display data is decreased according to a difference between the average luminance and the luminance reference value. When the average luminance is less than the luminance reference value, the magnitude of the driving voltage corresponding to the display data is increased according to the difference between the average luminance and the luminance reference value, and the duty cycle of the light source is correspondingly decreased. Wherein, the luminance reference value can be a middle luminance value, though the present invention is not limited thereto.

For example, when the average luminance is a half (i.e. ½) of the luminance reference value, the gain controller 230 adjusts the gamma voltages VG output by the gamma correction unit 240 through the data gain G1. Taking 255 gray levels as an example, a terminal corresponding to the gray level 1 outputs the gamma voltage of the gray level 2, and a terminal corresponding to the gray level 2 outputs the gamma voltage of the gray level 4, and the others are deduced by analogy. Moreover, since the gamma correction unit 240 can output the gamma voltage VG of the gray level 255 at the utmost, the terminals corresponding to the gray level 128 or the higher can only output the gamma voltage VG of the gray level 255.

On the other hand, when the average luminance is twice of the luminance reference value, the gain controller 230 adjusts the gamma voltages VG output by the gamma correction unit 240 through the data gain G1. Taking 255 gray levels as an example, the terminal corresponding to the gray level 1 outputs the gamma voltage of the gray level 0.5, and the terminal corresponding to the gray level 2 outputs the gamma voltage of the gray level 1, and the others are deduced by analogy.

Figure 4:
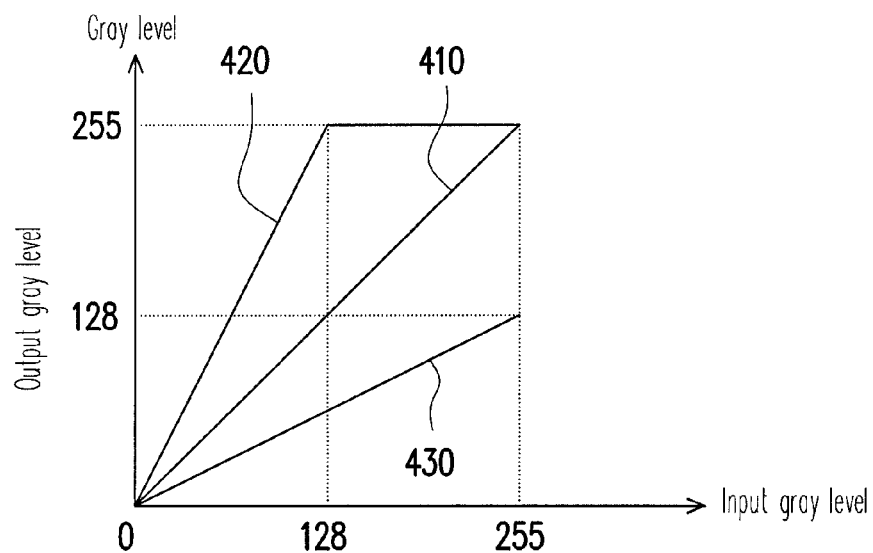
FIG. 4 is a curve diagram of output gray levels and input gray levels according to an embodiment of the present invention.

According to the above descriptions, relationships of the data gain G1, the display data DS and the driving voltage VDR can be represented by curves. FIG. 4 is a curve diagram of output gray levels and input gray levels according to an embodiment of the present invention. Referring to FIG. 4, a curve 410 is a relationship curve of the output gray levels and the input gray levels with the data gain G1 of 1, a curve 420 is a relationship curve of the output gray levels and the input gray levels with the data gain G1 of 2, and a curve 430 is a relationship curve of the output gray levels and the input gray levels with the data gain G1 of 0.5. Wherein, the input gray level is the gray level of the display data DS, and the output gray level is the gray level corresponding to the driving voltage VDR.

Moreover, when the data gain is greater than 1 (i.e. the average luminance of the frame data is greater than the luminance reference value), the duty cycles of the light sources can be correspondingly reduced. Taking the CS-LCOS panel as an example, the gain controller 230 can synchronously adjust the duty cycles of the three primary color light through the light source gain G2. Referring to FIG. 3, taking a duty pulse 310 corresponding to the red light as an example, a rising edge 311 of the duty pulse 310 can be shifted according to a magnitude of the light source gain G2. Namely, a trigger time of the rising edge 311 can be adjusted according to the light source gain G2. Moreover, a falling edge 312 of the duty pulse 310 is fixed to an end time of the red sub frame period $P_R$.

Generally, when the light source gain G2 is 1, a distance between the rising edge 311 and the falling edge 312 of the duty pulse 310 is a standard light-emitting period of the red LED, wherein the standard light-emitting period can be equal to or less than the red sub frame period $P_R$, which can be adjusted by those with ordinary skill in the art according to an actual design requirement. When the light source gain G2 is decreased, the trigger time of the rising edge 311 correspondingly approaches to the falling edge 312. Namely, a light-emitting time of the red LED is equal to the standard light-emitting period times the light source gain G2. Moreover, since the response time R1 for the liquid crystal being arranged to a display position is a low luminance section, a usage rate of the red color light source can be improved by adjusting the rising edge 311 of the duty pulse 310. Adjusting methods of the duty cycles of the green light and the blue light are the same to that of the duty cycle of the red light, and therefore detailed descriptions thereof are not repeated.

Figure 5:
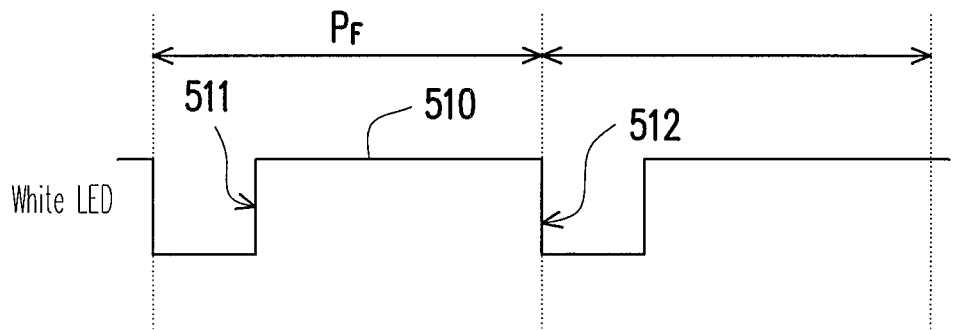
FIG. 5 is a driving waveform diagram of a white light according to an embodiment of the present invention.

Taking the CF-LCOS panel as an example, the gain controller 230 can synchronously adjust the duty cycle of the white light through the light source gain G2. FIG. 5 is a driving waveform diagram of the white light according to an embodiment of the present invention. Referring to FIG. 5, in the present embodiment, the duty cycle of the white light is adjusted by adjusting a trigger time of a rising edge of a duty pulse 510 corresponding to the white light. Moreover, a falling edge 512 of the duty pulse 510 is triggered at the end time of the frame period $P_F$. It should be noticed that a display effect of adjusting the magnitude of the driving voltage corresponding to the display data and the duty cycle of the color light source according to the average luminance of the frame data can be represented by a following function:

$$(1/G) \times BL \times (G^{1/\gamma} \times Data)^\gamma$$

Where, (1/G) is the light source gain, G is the data gain, $1/\gamma$ is a gamma correction parameter. Moreover, the display effect represented by the above function is the same to a general display effect (i.e. $BL \times (Data)^\gamma$).

Figure 6:
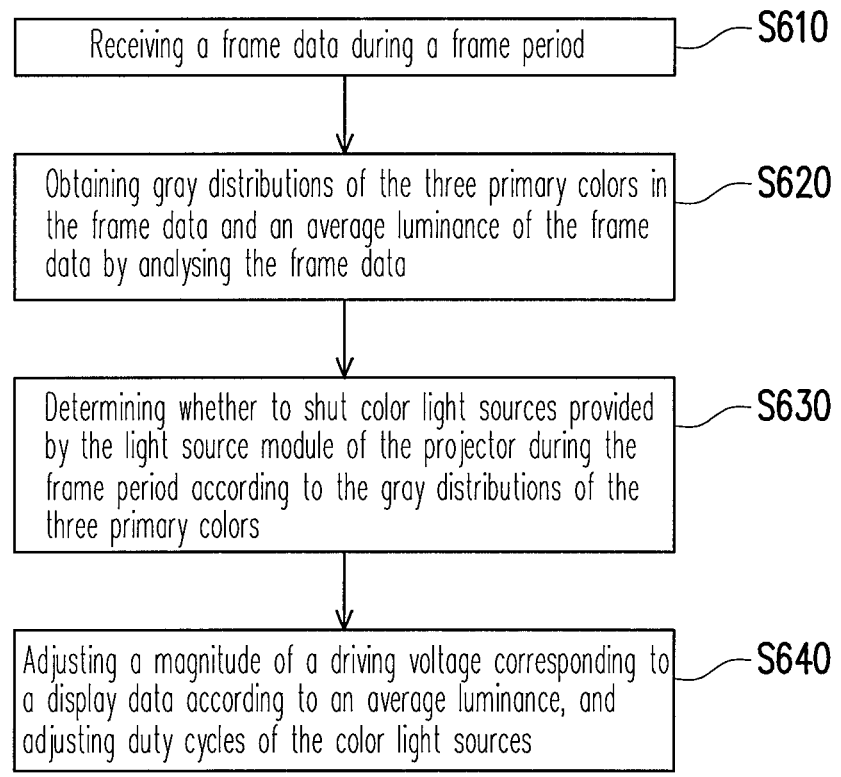
FIG. 6 is a flowchart illustrating a light source control method according to an embodiment of the present invention.

According to the above descriptions, a light source control method of a projector can be deduced. FIG. 6 is a flowchart illustrating a light source control method according to an embodiment of the present invention. Referring to FIG. 6, first, a frame data is received during a frame period (step S610), and gray distributions of the three primary colors in the frame data and an average luminance of the frame data are obtained by analysing the frame data (step S620). Next, whether to shut color light sources provided by the light source module of the projector during the frame period is determined according to the gray distributions of the three primary colors (step S630). Moreover, a data gain is adjusted during the frame period according to the average luminance, so as to adjust a magnitude of a driving voltage corresponding to a display data, and adjust the duty cycles of the color light sources (step S640). Detailed steps are the same as the above descriptions, and therefore detailed descriptions thereof are not repeated.

In summary, in the light source control method of the projector of the present invention, the less-used color light sources are shut according to the gray distributions of the three primary colors when the frame data of the pure frame is obtained. Moreover, the magnitude of the driving voltage corresponding to the display data and the duty cycles of the color light sources are adjusted according to the average luminance of the frame data. In this way, on the premise of maintaining a display effect, the light leakage phenomenon is avoided, so that the purity of the frame is improved, and the power consumption is reduced. Moreover, the duty cycle of the color light source can be adjusted by adjusting the rising edge of the duty pulse, so as to improve the usage rate of the color light source.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A light source control method of a projector, comprising:
  receiving a frame data of a frame period;
  performing data analysing according to the frame data, so as to obtain gray distributions of a plurality of colors in the frame data, wherein each of the plurality of colors corresponds to a color light source;
  determining whether to shut the color light source of the projector throughout the entire frame period according to the gray distributions of the colors, wherein the color light source that is shut does not emit the corresponding color light throughout the entire frame period for displaying a color image; and
  shutting the color light source which have been determined to be shut throughout the entire frame period.

2. The light source control method of the projector as claimed in claim 1, further comprising:
  performing data analysing according to the frame data, so as to obtain an average luminance of the frame data; and
  adjusting a data gain of the frame data and duty cycles of the color light sources according to the average luminance during the frame period.

3. The light source control method of the projector as claimed in claim 2, wherein the step of adjusting the data gain of the frame data and the duty cycles of the color light sources according to the average luminance during the frame period comprises:
  decreasing the data gain according to a difference between the average luminance and a luminance reference value when the average luminance is greater than the luminance reference value; and
  increasing the data gain according to a difference between the average luminance and the luminance reference value, and correspondingly reducing the duty cycles of the color light sources when the average luminance is less than the luminance reference value.

4. The light source control method of the projector as claimed in claim 2, wherein the step of adjusting the duty cycles of the color light sources comprises:
  adjusting a trigger time of a rising edge of a duty pulse corresponding to each of the color light sources.

5. The light source control method of the projector as claimed in claim 4, wherein a falling edge of the duty pulse corresponding to each of the color light sources is triggered at an end time of a sub frame period corresponding to each of the color light sources in the frame period.

6. The light source control method of the projector as claimed in claim 1, wherein the step of determining whether to shut all or a portion of a plurality of the color light sources of the projector during the frame period according to the gray distributions of the colors comprises:
  shutting a first color light source in the color light sources corresponding to a first color when a gray level average of the first color of the colors is less than or equal to a threshold value; and
  activating the first color light source when the gray level average is greater than the threshold value.

7. The light source control method of the projector as claimed in claim 1, wherein the step of determining whether to shut all or a portion of a plurality of the color light sources of the projector during the frame period according to the gray distributions of the colors comprises:
  shutting a first color light source in the color light sources corresponding to a first color when a gray distribution of the first color of the colors is smaller than or equal to a threshold range; and
  activating the first color light source when the gray distribution of the first color is beyond the threshold range.

8. The light source control method of the projector as claimed in claim 1, wherein the colors comprise a red color, a blue color and a green color.

9. The light source control method of the projector as claimed in claim 1, wherein the color light sources comprise a red light, a blue light and a green light.

10. The light source control method of the projector as claimed in claim 1, wherein the projector is a liquid crystal on silicon (LCOS) projector.

11. A light source control method of a projector, comprising:
  receiving a frame data of a frame period;
  performing data analysing according to the frame data, so as to obtain gray distributions of a plurality of colors in the frame data;
  determining whether to shut a light source of the projector throughout the entire frame period according to the gray distributions of the colors, wherein the color light source that is shut does not emit a light throughout the entire frame period for displaying a color image; and
  shutting the color light sources for the entire frame period when the light source is determined to be shut.

12. The light source control method of the projector as claimed in claim 11, further comprising:
  performing data analysing according to the frame data, so as to obtain an average luminance of the frame data; and
  adjusting a data gain of the frame data and a duty cycle of the light source according to the average luminance during the frame period.

13. The light source control method of the projector as claimed in claim 12, wherein the step of adjusting the data gain of the frame data and the duty cycle of the light source according to the average luminance during the frame period comprises:
  decreasing the data gain according to a difference between the average luminance and a luminance reference value when the average luminance is greater than the luminance reference value; and
  increasing the data gain according to a difference between the average luminance and the luminance reference value, and correspondingly reducing the duty cycle of the light source when the average luminance is less than the luminance reference value.

14. The light source control method of the projector as claimed in claim 12, wherein the step of adjusting the duty cycle of the light source comprises:
  adjusting a trigger time of a rising edge of a duty pulse corresponding to the light source.

15. The light source control method of the projector as claimed in claim 14, wherein a falling edge of the duty pulse corresponding to the light source is triggered at an end time of the frame period.

16. The light source control method of the projector as claimed in claim 11, wherein the step of determining whether to shut the light source of the projector during the frame period according to the gray distributions of the colors comprises:
   shutting the light source when a gray level average of the gray distributions of the colors is less than or equal to a threshold value; and
   activating the light source when the gray level average is greater than the threshold value.

17. The light source control method of the projector as claimed in claim 11, wherein the step of determining whether to shut the light source of the projector during the frame period according to the gray distributions of the colors comprises:
   shutting the light source when the gray distributions of the colors are smaller than or equal to a threshold range; and
   activating the light source when one of the gray distributions of the colors is beyond the threshold range.

18. The light source control method of the projector as claimed in claim 11, wherein the colors comprise a red color, a blue color and a green color.

19. The light source control method of the projector as claimed in claim 11, wherein the light source is a white light.

20. The light source control method of the projector as claimed in claim 11, wherein the projector is a liquid crystal on silicon (LCOS) projector.

\* \* \* \* \*